(12) United States Patent
Plesh, Sr.

(10) Patent No.: US 8,047,353 B1
(45) Date of Patent: Nov. 1, 2011

(54) CONVEYOR FOR STEEL STRIP COILS AND THE LIKE

(76) Inventor: Ronald L. Plesh, Sr., Orchard Park, NY (US)

( * ) Notice: Subject to any disclaimer, the term of this patent is extended or adjusted under 35 U.S.C. 154(b) by 384 days.

(21) Appl. No.: 11/650,329

(22) Filed: Jan. 5, 2007

(51) Int. Cl.
*B65G 23/00* (2006.01)
(52) U.S. Cl. .................. 198/468.9; 198/469.1; 198/813
(58) Field of Classification Search ............... 198/469.1, 198/468.9
See application file for complete search history.

(56) References Cited

U.S. PATENT DOCUMENTS

| | | | |
|---|---|---|---|
| 1,934,835 A | | 11/1933 | Weiss |
| 2,438,068 A | * | 3/1948 | Mercier ................ 198/813 |
| 2,529,777 A | | 11/1950 | McInnis |
| 3,477,627 A | | 11/1969 | Webers |
| 3,571,892 A | | 3/1971 | Levy |
| 4,432,450 A | | 2/1984 | Dorigo |
| 4,501,353 A | | 2/1985 | Burkhardt |
| 4,569,435 A | | 2/1986 | McGovney |
| 5,582,287 A | * | 12/1996 | Heit et al. ............... 198/867.01 |
| 6,244,426 B1 | | 6/2001 | Murano et al. |
| 6,802,414 B2 | * | 10/2004 | Buhne ........................ 198/813 |
| 6,880,695 B2 | | 4/2005 | Suzuki et al. |
| 2006/0083888 A1 | | 4/2006 | Downes et al. |

OTHER PUBLICATIONS

Anchor Conveyor Products, Inc., Data sheet titled "Typical Caterpillar Drive," 2005 (or before).

* cited by examiner

*Primary Examiner* — Kavel Singh
(74) *Attorney, Agent, or Firm* — James C. Simmons

(57) ABSTRACT

A conveyor comprising an endless accumulation chain and at least two sets of devices for effecting incremental movements of the chain at respective stations. Each set of devices includes a first device for engaging and disengaging respectively the chain, a second device engaged to the first device for moving it from a first position to a second position while it is engaged to the chain for effecting an incremental movement of a portion of the chain and for retracting the first device to the first position while the first device is disengaged from the chain, and a third device for engaging the chain to lock the chain portion in a fixed position while the first device is disengaged from the chain and for disengaging from the chain when the first device is engaged to the chain portion so that the first device may be moved to the second position for incrementally moving the chain portion. In order to incrementally move the conveyor chain, the first device is engaged to the chain, the second device is disengaged from the chain, the engaged first device is moved from the first position to the second position to effect incremental movement of the chain, the second device is engaged to the chain to maintain a chain portion position, the first device is disengaged from the chain, and the first device is retracted to the first position to repeat the method for another incremental chain movement.

20 Claims, 3 Drawing Sheets

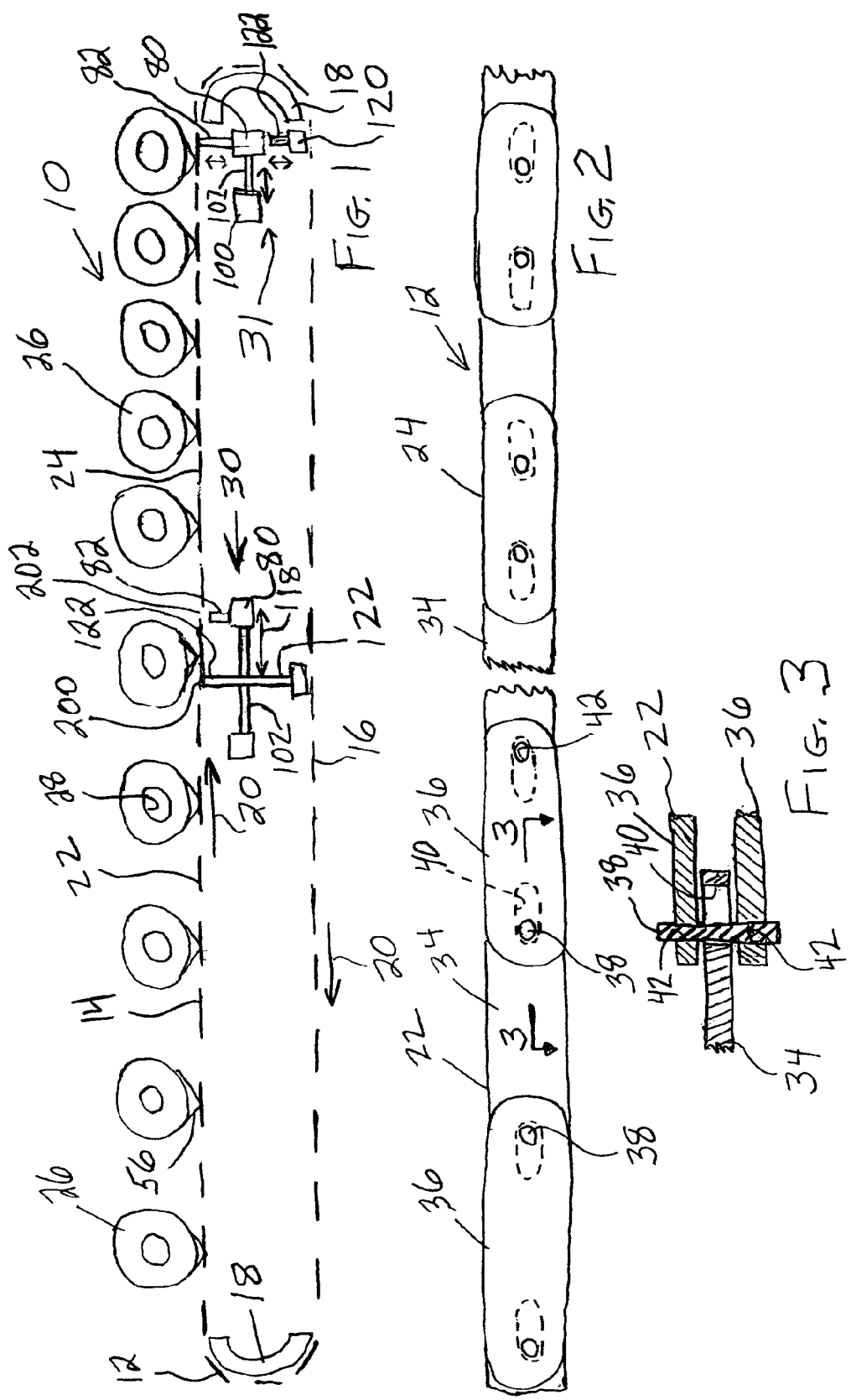

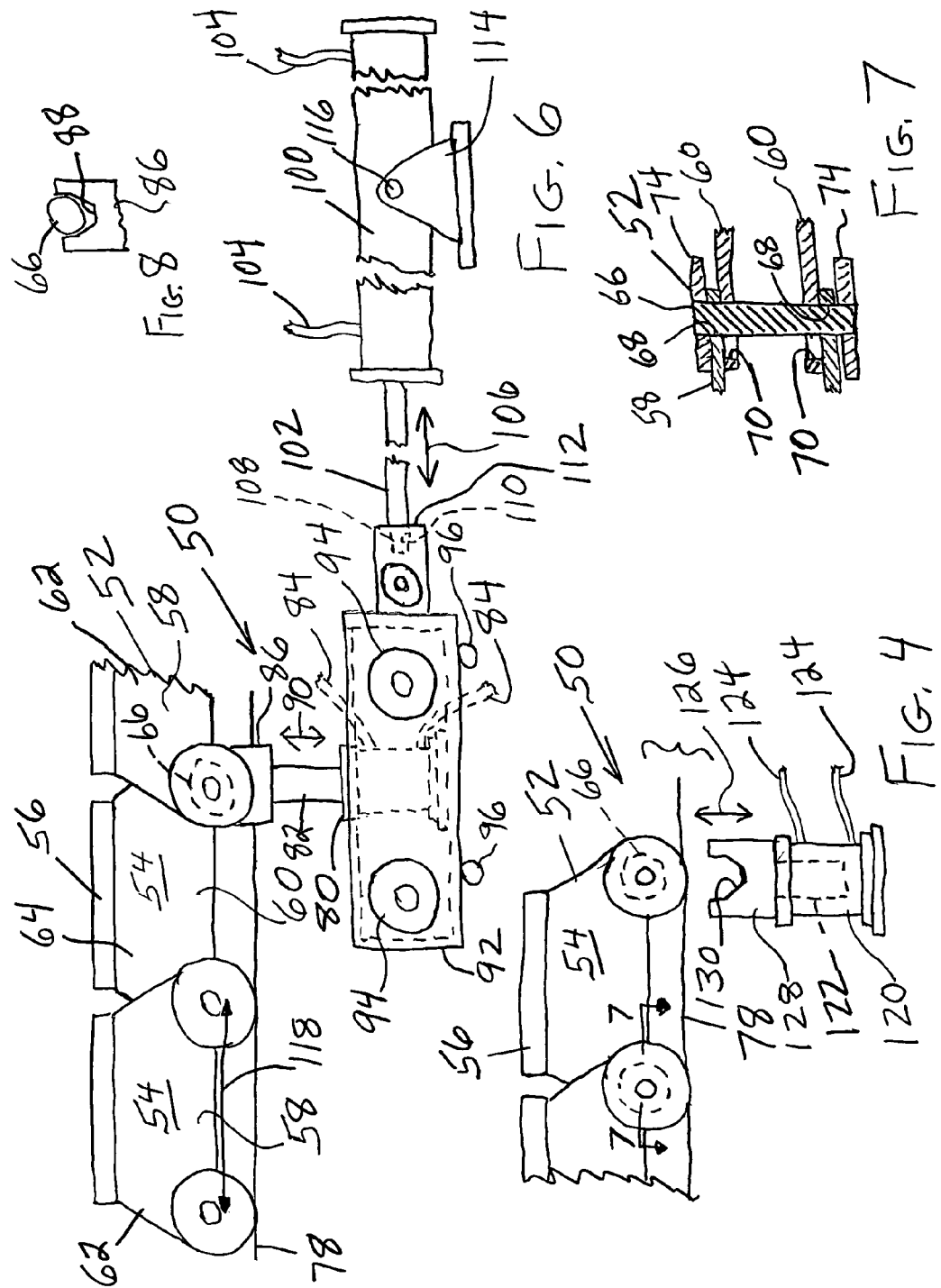

CONVEYOR FOR STEEL STRIP COILS AND THE LIKE

The present invention relates generally to conveyors. More particularly, the present invention relates to structure for driving or effecting movement of endless conveyor chain.

One use for a conveyor system is for movement of very large objects such as coils of steel strip. Individual coils may weigh in the range of 10,000 to 100,000 pounds, and it may be desired that many of these coils be on the conveyor and being conveyed at any given time. With a standard conveyor with drive sprockets, there is a limit to the conveyor length due to the load becoming greater with increased length. The conveyor length may be increased with the use of transfer conveyors or by the use of Caterpillar drives spaced along the conveyor length. A problem with Caterpillar drives as well as other sprocket drives is the occurrence of wear on the chain at the drive sprockets. Perhaps as much as 90 percent of wear of a sprocket-drive conveyor chain is due to movement about sprockets. It is thus desirable to eliminate drive sprockets and use instead a suitable reduced wear drive such as hydraulic cylinder means.

U.S. Pat. No. 4,432,450 to Dorigo discloses a mesh-belt conveyor for conveying materials into industrial furnaces which comprises a continuous mesh-belt wound at one end around an idle reversing roller and engaged at its other end in a labyrinth device subjected to a reciprocating motion in directions of conveyor movement, the belt being also intermittently clamped, close to the reversing roller, by a gripping device which produces intermittent movements of the belt toward the reversing roller in alternation with the movements of the labyrinth device, in order to cause an intermittent advance of the belt. The gripping device comprises a pair of side-by-side plates between which slides the belt and operated to clamp and unclamp to the belt by a first fluid pressure cylinder-piston unit, and a second fluid pressure cylinder-piston unit adapted to impart reciprocating movements to the gripping device parallel to the belt for movement of the belt by moving the clamped portion of the belt.

The resulting necessity of the complicated drive structure of Dorigo to "pull" the mesh-belt about the reversing roller may undesirably cause wear of the mesh-belt due to its articulation about the reversing roller under load. This wear is not as much of a problem with belts (just remove a belt portion of the appropriate length) as it is with chain conveyors where an entire link (all or nothing) must be removed. Additionally, the lack in Dorigo of a suitable mechanism for suitably holding the belt in a position for indexing may result in inaccurate positioning of material for loading, unloading, weighing, banding, marking, etc.

U.S. Pat. No. 2,529,777 to McInnis discloses a conveyor drive for an endless conveyor chain which is mounted freely on rollers at each end. The drive comprises two or more hydraulic cylinders moving in a controlled sequence to "give a more uninterrupted motion to the conveyor chain. With a multiple cylinder installation with each cylinder moving in controlled sequence a continued uninterrupted motion in the chain is possible." Each cylinder is mounted parallel to conveyor chain and adjacent thereto and has a chain engaging dog attached to the end of the piston connecting rod for movement of the chain.

U.S. Pat. No. 3,571,892 to Levy discloses a conveyor system, particularly for riveting binders, having an endless conveyor comprised of rigid link members pivotably connected together and caused to intermittently move by fluid motor means having cylinder/piston arrangements. Two such motor means are operated sequentially so that one motor means reciprocates to a position so that it no longer supports a link member. This permits the link member to rotate through an arc of approximately 90 degrees to introduce slack in the chain necessary to facilitate movement of the conveyor by the other motor means. Then this other motor means, which has a pusher on the end of its piston for engaging a chain link for moving the chain, moves the conveyor through a distance corresponding generally to the length of a link member.

The chain drives of McInnis and Levy undesirably do not lock the chain with the result that it may move further than desired by inertia or may move backwardly when the chain is released.

It is thus considered desirable to achieve more precise indexing movements (without the chain being free to move after its release) so as to get the coils or other conveyed items in more exact positions as a conveyor chain is moved by hydraulic cylinders.

It is also considered desirable to not interrupt the continuous movement of coils onto the conveyor so as to avoid having to shut down the entire mill. In order to avoid interruption of coil movement, accumulating chain may be used in conjunction with the hydraulic cylinders so that the chain may, for example, be allowed to "bunch-up" at an unloading station while allowing coils to be continually loaded without interruption at a loading station. For the purposes of this specification and the claims, "accumulation" chain is defined as chain which is adapted or constructed (such as by slots in the links) so that a group of links or other chain portions may be free to "bunch-up" as well as "spread-apart." For the purposes of this specification and the claims, a "chain" is defined as a flexible series of joined links, and a "link" is meant to include a car such as illustrated in FIGS. 4 to 7 of the appended drawings. Examples of accumulation chain may be found in U.S. Pat. Nos. 4,501,353; 6,244,426; 6,880,695; and published application 2006/0083888. Other patents which may be of interest to the present invention include U.S. Pat. Nos. 4,569,435; 3,477,627; and 1,934,835. All of the hereinbefore discussed patents/published applications are incorporated herein by reference.

It is accordingly an object of the present invention to provide a conveyor with substantially reduced chain joint wear.

It is another object of the present invention to provide such a conveyor with precise indexing control.

It is a further object of the present invention to provide such a conveyor which allows accumulation of the chain.

It is still another object of the present invention to provide the drive for such a conveyor which is inexpensive, non-complex, reliable, and easy to operate and maintain.

In order to provide a chain conveyor with substantially reduced chain joint wear, in accordance with the present invention, a set of devices is provided which comprises a first device including a cylinder having an extendable and retractable rod adapted for engaging and disengaging the chain, and a second device engaged to the first device and adapted for moving the first device from a first position to a second position while the first device rod is engaged to the chain and for retracting the first device to the first position while the first device rod is disengaged from the chain.

In order to provide precise indexing control for the conveyor, in accordance with the present invention, the set includes a third device which is adapted for engaging and disengaging respectively the chain to engage the chain to lock a portion of the chain in a fixed position while the first device is disengaged from the chain and to disengage from the chain while the first device is being moved to the second position for an incremental movement of the chain.

In order to allow chain accumulation, in accordance with the present invention, a pair (or more) of the device sets are provided spaced along the chain, for example, one set at a loading station and an other at an unloading station.

The above and other objects, features, and advantages of the present invention will be apparent in the following detailed description of the preferred embodiments thereof when read in conjunction with the accompanying drawings wherein the same reference numerals denote the same or similar parts throughout the several views.

BRIEF DESCRIPTION OF THE DRAWINGS

FIG. 1 is a schematic view of a coil conveyor in accordance with the present invention, with eyes of the coils perpendicular to the direction of travel.

FIG. 2 is a side view of a portion of chain for the conveyor.

FIG. 3 is a partial sectional view of the chain portion taken along lines 3-3 of FIG. 2.

FIG. 4 is a partial side view of an alternative embodiment of the conveyor chain in the form of linked cars and a locking cylinder therefor, shown disengaged from the chain.

FIG. 6 is a view similar to that of FIG. 4 of a portion of the conveyor chain of FIG. 4 and chain engaging and indexing cylinders therefor, shown engaged to the chain.

FIG. 7 is a sectional view of the chain taken along lines 7-7 of FIG. 4.

FIG. 8 is a partial view of a head of the rod for the engaging cylinder of FIG. 6, illustrated in engagement with a shaft of the chain.

DETAILED DESCRIPTION OF THE PREFERRED EMBODIMENTS

Figure 5:
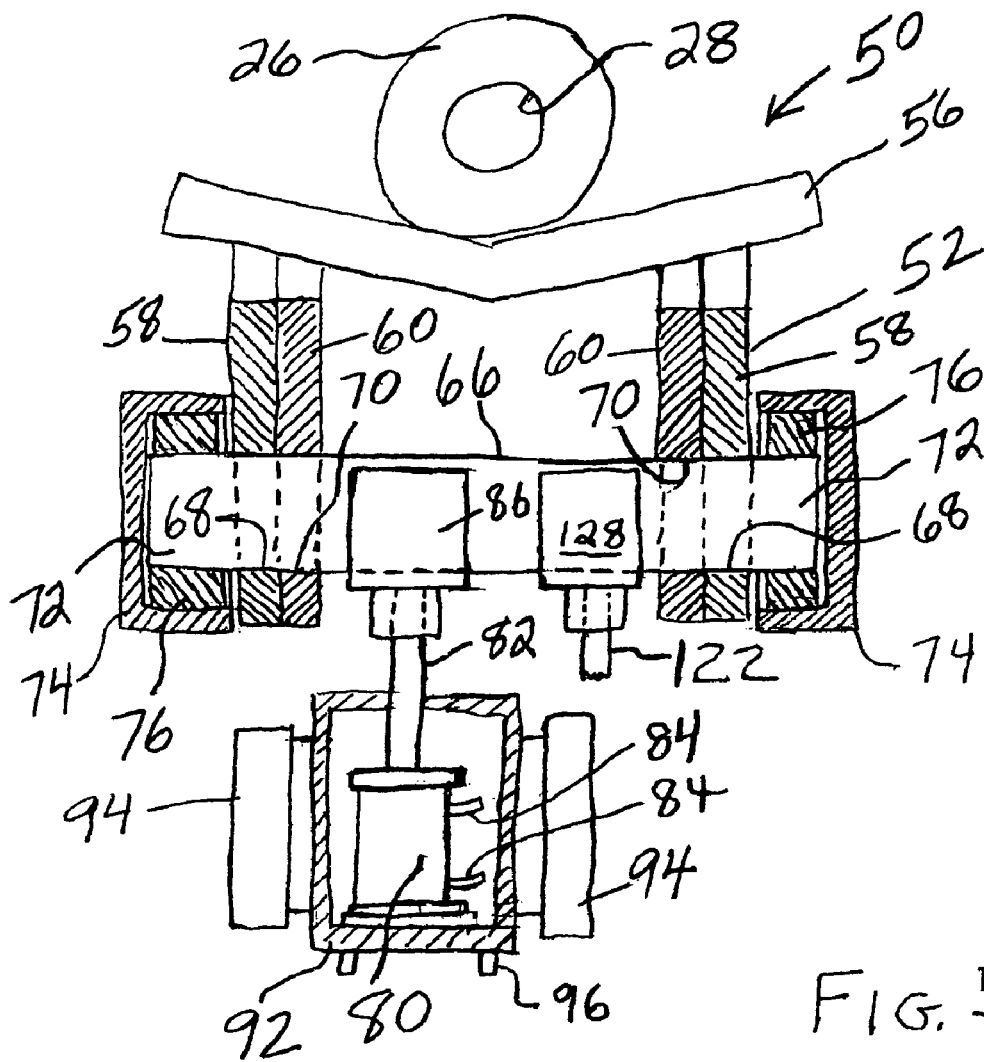
FIG. 5 is a partially sectional view thereof taken along a shaft linking two cars of the chain, with the coil eyes shown parallel to the direction of travel.

Referring to FIG. 1, there is shown generally at 10 a conveyor which includes an endless or continuous moving chain or track, illustrated at 12 and shown and described in greater detail hereafter and in later figures, which has a loading/unloading section 14 and a return section 16. Conventional turnarounds or guides 18 at the respective ends lead or guide the chain 12 between the loading/unloading and return sections 14 and 16 respectively as the chain 12 moves in the direction illustrated by arrows 20. Section 14 includes a loading portion or station 22 and an unloading portion or station 24. Thus, the individual parts of the chain 12 continually move from the loading station 22 to the unloading station 24 to the return section 16 then back to the loading station 22. Coils 26 of steel strip or the like or other items are loaded on the chain 12 at the loading station 22 and are unloaded therefrom at the unloading station 24. While the coils 26 are illustrated with their holes or eyes 28 oriented crosswise of the track, it should be understood that they may be oriented otherwise, such as lengthwise of the track or vertically. While, for ease of illustration, only the loading and unloading stations are illustrated, it should be understood that the conveyor 10 may have other stations, for example, banding and weighing stations.

Sprocket drives result in substantial wear of the chain, and excessive chain joint wear is difficult to remedy. In order to substantially reduce the chain joint wear (by up to perhaps 90 percent), in accordance with the present invention, drive sprockets are eliminated, and, instead, at least one but preferably (for purposes hereinafter discussed) two (or more) sets, illustrated at 30 and 31, of hydraulic cylinders are suitably positioned and spaced over the length of the chain 12 to drive the chain 12. The make-up and positioning of these hydraulic cylinder sets 30 are described hereinafter. For example, another cylinder set may be placed, if needed, at the left end of the conveyor of FIG. 1, and as many cylinder sets may be provided as needed for the requirements of a particular conveyor. Hereinafter, except where otherwise indicated or apparent from the context, the discussion with respect to one of the sets 30 and 31 of cylinders is meant to apply equally to the other set of cylinders as well as any other of the sets of cylinders.

Referring to FIGS. 2 and 3, the chain 12 is shown to have single links 34 alternating with double links 36 between which the single links 34 are partially sandwiched. A single link 34 is suitably flexibly connected at each end to the corresponding pair of double links 36 by a pin 38 which is received in apertures, illustrated at 40 and 42, in the links 34 and 36 respectively and secured to the links by suitable conventional means (not shown) but so that the links may suitably flex (rotate) about the respective pins 38.

If the unloading of coils 26 at the unloading station 24 is slowed, it is still desired that the coils be loaded as they are received at the loading station 22 in order to avoid the difficulty and expense of having to temporarily shut the mill down. In order to allow the coils 26 to be bunched up at the unloading station 24 and to be spread out at the loading station 22, as illustrated in FIG. 1, the chain 12 is preferably accumulation chain. In order to effect the bunching up and spreading out of the chain links 34 and 36 to cause the chain 12 to "accumulate," the apertures 40 in links 34 are shown to be oblong, i.e., having a length in the chain direction which is perhaps 3 times the pin 38 diameter, the accumulation of these aperture lengths over a number of linkages providing the bunching up or spreading out of chain portions. The chain portion to the left in FIG. 2 (shown also in FIG. 3) shows the chain in the loading station 22 spread out, while the chain portion to the right in FIG. 2 shows the chain in the unloading station 24 bunched up, thereby allowing coils 26 to continue to be loaded while the unloading thereof is slowed so that the mill does not have to be shut down. It should of course be understood that the chain 12 can be otherwise suitably formed to be accumulation chain. For example, holes 42 may also or alternatively be oblong. As discussed in greater detail hereinafter, at least both cylinder sets 30 and 31 are preferably provided to suitably accommodate the loading and unloading stations 22 and 24 respectively.

Referring to FIGS. 4 to 7, there is shown generally at 50 an alternative embodiment of the conveyor having an alternative embodiment, shown at 52, of the chain. The chain links are cars 54 having V-shaped saddles or platforms 56 upon which the coils 26 respectively are loaded. Alternate ones 62 of the cars 54 have outer side walls or link plates 58, and the ones 64 of the cars 54 between the alternate cars 62 have inner side walls or link plates 60. To flexibly link a pair 62 and 64 of the cars together, a shaft (pin) or axle 66 is received in apertures, illustrated at 68, in the outer side walls 58 of a car 62 and in apertures, illustrated at 70, in the inner side walls 60 of an adjacent car 64 in a manner using principles commonly known to those of ordinary skill in the art to which the present invention pertains such as to allow the cars to pivot relative to each other about the shaft 66. Shaft 66 has portions 72 which extend outwardly beyond the outer side walls 58 on both sides. Wheels 74, slid or rolled along tracks, illustrated at 78, which may be similar to train tracks, are suitably and conventionally mounted on the shaft end portions 72 respectively such as with bearings 76, as is well known in the art to which the present invention pertains. Thus, the shaft 66 serves both to pivotly link adjacent cars together and for the mounting of wheels.

As illustrated in FIG. 7, the car chain 52 is, similar to the chain 12, accumulation chain. Thus, the inner side wall apertures 70 are shown to be oblong so as to allow chain accumulation similarly as discussed for apertures 40 with respect to FIG. 3. It should of course be understood that the outer side wall apertures 68 may also or alternatively be oblong.

It should be understood that chain in accordance with the present invention is not limited to the embodiments 12 and 52 disclosed herein and may be otherwise suitably formed and shaped.

Each set 30 of hydraulic cylinders includes a first or chain engaging cylinder 80 (FIG. 6) having a chain engaging cylinder rod 82 which is operated by supplying hydraulic fluid through lines 84 using principles commonly known to those of ordinary skill in the art to which this invention pertains to extend the rod 82, as shown in FIG. 6, to lockingly engage a shaft 66 (or suitably engage chain 12) and to retract the rod 82 (similarly as shown for the cylinder rod 122 of FIG. 4, discussed hereinafter) to disengage the shaft 66 (or chain 12), as illustrated by arrow 90. The outer end of the rod 82 is suitably fitted with a head 86 the outer or terminal end of which, as illustrated in FIG. 8, has a suitably shaped and sized cut-out 88 for lockingly receiving the shaft 66, i.e., receiving the shaft 66 in such a manner that the shaft cannot be moved in a direction along the length of the chain unless the head 86 is caused to move in that direction. The cylinder 80 is suitably received and secured within a carriage 92 which may have suitable wheels 96 for movement along a floor and access portals 94.

Each set 30 of hydraulic cylinders also includes a second or indexing cylinder 100 (FIG. 6) having a cylinder rod 102 which is operated by supplying hydraulic fluid through lines 104 using principles commonly known to those of ordinary skill in the art to which this invention pertains to extend and retract the rod 102, as illustrated by arrow 106. The outer or terminal end portion 108 of the rod 102 is suitably secured to the carriage 92 to effect indexing movement thereof in response to extension and retraction of the rod 102. The rod terminal portion 108 is shown received and is suitably secured within an aperture 110 of a carriage abutment 112. The cylinder 100 is suitably supported by support member 114 which is suitably secured to a floor or other structure to prevent the cylinder 100 from moving (maintain it stationary) as its rod 102 is extended and retracted to effect indexing movement of the carriage 92 to which it is attached. The cylinder 100 is pivotly connected to support member 114 by pivot pin 116 to prevent binding (maintain suitable alignment). By "indexing" is meant a predetermined incremental movement of the chain 12 or 52 in response to extension of the rod 102 (or alternatively retraction of rod 102) with the rod 82 lockingly engaging the shaft 66 (or otherwise suitably lockingly engaging the chain 12 or 52). This predetermined incremental movement may, for example, be equal to the length, illustrated at 118, of a car 54, i.e., the distance between the shaft centers, or may be multiples of this length. After an indexing movement has occurred, the rod 102 is retracted (alternatively extended) so that another indexing movement can occur.

It can thus be seen that, while the rod 82 lockingly engages a chain shaft 66, the respectively attached cars 54 are desirably not free to move appreciably (other than the inconsequential movements as may be allowed by the accumulation apertures 70 of the attached cars) except as initiated by indexing cylinder 100. It is necessary that the positions of the shafts 66 to be engaged be controlled during operation of the conveyor so that a shaft 66 to be engaged is suitably in a position for engagement by the head 86. It is also desirable to control shaft position in order to get the load in a more exact position when such is necessary. However, when the rod 82 is disengaged from the chain 52, it no longer restrains the immediate chain portion from more substantial movement which may occur, for example, if the chain is bumped during loading of a coil, if the chain portion is not otherwise restrained from such movement. Therefore, in order to restrain the chain portion (more particularly the shaft to be engaged for the next indexing stroke) from such movement when it is not lockingly engaged by rod 82, in accordance with the present invention, a third or locking cylinder 120 (FIG. 4) having a cylinder rod 122 is provided which is operated by supplying hydraulic fluid through lines 124 using principles commonly known to those of ordinary skill in the art to which this invention pertains to extend and retract the rod 122, as illustrated by arrow 126. The outer or terminal end of the rod 122 is suitably fitted with a head 128 (which is similar to head 86) which has a cut-out 130 suitably sized and shaped for lockingly engaging a shaft 66 (or otherwise suitably lockingly engaging the chain or track) when the rod 122 is extended. The rod 122 is shown in FIG. 4 retracted and therefore not engaging the shaft 66. When the rod 122 is extended, it raises the head 128 to lockingly receive the shaft 66 within the cut-out 130 to thereby prevent movement thereof so that the shaft position (of the shaft to be lockingly engaged for another indexing stroke) may be precisely maintained between indexing strokes when the head 86 is not lockingly engaging the shaft 66. As a result, the respective shaft position is maintained so that it is in proper position to be lockingly engaged by head 86 for the initiation of another indexing stroke. The cylinder 120 is suitably secured to the floor or other structure to restrain it from movement (so that it remains stationary while lockingly engaging the shaft). While the cylinder 120 or an equivalent thereof is preferred, in its absence it would be necessary to rely on friction to hold the shaft position.

As illustrated in FIG. 1, the cylinders 80 and 120 are preferably positioned, prior to an indexing stroke, so that the rod 82 has just lockingly engaged the same shaft 66 which was lockingly engaged (now released) by rod 122, as seen for cylinder set 31. In order not to allow any unplanned chain movement, both cylinder rods 82 and 122 may be positioned to engage the same shaft 66 at the same time, as illustrated in FIG. 5, or alternatively the cylinder rods 82 and 122 may engage adjacent pins respectively whose positions are fixed relative to each other such as the pins 38 in opposite ends of a link 36 (FIG. 3), or the cylinder rods 82 and 122 may otherwise suitably engage the chain to prevent such unplanned chain movement.

Cylinder set 30 illustrates the extension of rod 102 (full stroke) for an indexing stroke wherein the cylinder 80 is incrementally advanced one job space, i.e., by the distance 118 (which may, for example, be about 9 feet) after which the rod 122 is extended and lockingly engages the next shaft 66 and holds it in position until the rod 102 is fully retracted so that rod 82 can lockingly engage this next shaft 66 for another indexing stroke, at which time prior to the next indexing stroke rod 122 disengages this next shaft 66. The cycle thus returns to the cylinder and rod position illustrated for cylinder set 31, it being of course understood that each cylinder set goes through this cycle independently. Cylinder rod sensors (not shown) are suitably provided to indicate proper positions of locking cylinder rods 82 and 122.

While this application discloses the chain drive mechanism as being one or more sets of hydraulic cylinders, it should be understood that other devices other than hydraulic cylinders that achieve the same functions may be utilized. For example, pneumatic cylinders may be provided instead of the hydraulic cylinders. For another example, a suitable detent device may be placed instead of the cylinder 120 to lockingly engage and disengage a shaft. Such other devices are meant to come within the scope of the present invention.

The number of cylinder pairs depends on the length of the chain and must be sufficient for the load to be carried. If the chain length and load are relatively small, then one set of cylinders may be sufficient. If the chain is accumulation chain, then the number of cylinder sets is preferably at least two, and is preferably one cylinder set for each accumulation station. For example, if there are 4 accumulation stations (loading, banding, weighing, and unloading), then it is preferred that there be at least 4 cylinder sets, one for each accumulation station. As seen in FIG. 1, the bunched-up cars at the unloading station 24 resulting from slow unloading allows the cylinder set 31 to wait until a coil 26 is unloaded before moving the chain forwardly. The need to load coils at the loading station 22 as they arrive may require that the cars be moved forward more quickly as they are loaded, as achieved by the cylinder set 30, so that it doesn't become necessary to shut the mill down. Thus, the accumulation chain is spread out as needed along the return section 16 and at the loading station 22 with the result that the accumulation chain is bunched up at the unloading station 24.

In order to incrementally move a conveyor track, in accordance with the present invention, with cylinder rod 122 already lockingly engaged to a shaft 66 (or otherwise to the chain) and holding its position, the first cylinder rod 82 is engaged to the same shaft 66 (or closely adjacent shaft whose position is fixed relative thereto). Cylinder rod 122 is then disengaged from the shaft 66 so that the cylinder set is as illustrated for the cylinder set 31 in FIG. 1. The cylinder rod 102 is then extended, as illustrated with respect to the cylinder set 30 in FIG. 1, to move the cylinder 80 and thus the shaft 66 forward one increment 118 from a first position, illustrated at 200, to a second position, illustrated at 202, thereby providing indexing movement of the conveyor chain. While the cylinder rod 82 remains engaged to the shaft 66 at position 202, the cylinder rod 122 is extended to lockingly engage the next shaft 66 at position 200 and hold its position. The cylinder rod 82 is then retracted to release it from the shaft, and the indexing cylinder rod 102 is then retracted to return cylinder 80 to position 200, i.e., to engage a suitable adjacent shaft. The cylinder rod 82 is then extended to lockingly engage the next or adjacent shaft 66 and the cylinder rod 122 retracted and released therefrom to begin a new indexing cycle.

For cylinder set 31, indexing movement occurs when a coil 26 has been unloaded with the result that the accumulation chain in the unloading section 24 may accumulate or bunch-up or become compressed, as illustrated in FIG. 1. For cylinder set 30, indexing movement occurs when a coil 26 has been loaded with the result that the accumulation chain in the loading section 22 (as well as in the return section 16) may spread out or become in an extended condition, as illustrated in FIG. 1, due to the necessity to not delay the loading of the coils to avoid having to temporarily shut down the mill. Thus, the loading station 22 can continue to receive coils and index while the unloading station 24 is stationary. By loading the coils faster than they are unloaded, the coils and the accumulation chain will bunch up in the unloading section, as illustrated in FIG. 1. The accumulation chain with a cylinder set at each station desirably allows some latitude in the lengths of time needed to perform various functions at various stations so that the mill may be kept optimally functioning and so that the necessity for mill shut-down may be minimized.

The availability of accumulation chain gives the operator the ability to have one station in a fixed position for one function while indexing the chain at another station for another function. Since a finite amount of accumulation is available, during operation an accumulation portion of chain is desirably freed up as soon as possible so as to maintain accumulation chain available for later use when needed.

It should be understood that, while the present invention has been described in detail herein, the invention can be embodied otherwise without departing from the principles thereof, and such other embodiments are meant to come within the scope of the present invention as defined by the appended claims.

What is claimed is:

1. A conveyor comprising an elongate endless chain and at least one set of devices for effecting incremental movements of said chain in a direction longitudinally along said chain, said set of devices comprising a first device including a cylinder having an extendable and retractable rod adapted for engaging and disengaging said chain wherein said cylinder is positioned to effect engaging and disengaging said chain by said rod, and a second device positioned and attached to said first device in a manner to effect movement of said first device from a first position to a second position while said first device rod is engaged to said chain thereby to effect an incremental movement of at least a portion of said chain in a direction longitudinally along said chain and in a manner to effect retraction of said first device to the first position while said first device rod is disengaged from said chain thereby to position said first device in a position to effect another incremental movement of at least a portion of said chain in a direction longitudinally along said chain.

2. A conveyor according to claim 1 wherein said set of devices further comprises a third device positioned and adapted for engaging said chain to lock a portion of said chain in a fixed position while said first device is disengaged from said chain and for disengaging from said chain when said first device is engaged to the portion of said chain so that said first device may be moved to the second position for incrementally moving the portion of said chain in a direction longitudinally along said chain.

3. A conveyor according to claim 2 wherein said chain is an accumulation chain, and said at least one set of devices comprises at least two of said at least one set of devices spaced longitudinally along said chain.

4. A conveyor according to claim 1 wherein said chain is an accumulation chain.

5. A conveyor according to claim 1 wherein said at least one set of devices comprises at least two of said at least one set of devices.

6. A conveyor according to claim 1 wherein said chain is an accumulation chain, and said at least one set of devices comprises at least two of said at least one set of devices.

7. A conveyor according to claim 1 wherein said cylinder is a hydraulic cylinder and wherein said second device is a hydraulic cylinder.

8. A conveyor according to claim 1 wherein said chain comprises a series of cars and axles interconnecting said cars respectively and wherein said rod has a cut-out in a terminal end thereof for engaging said axles respectively.

9. A conveyor comprising an elongate endless chain and at least one set of devices for effecting incremental movements of at least a portion of said chain in a direction longitudinally along said chain, said set of devices including a first device positioned and adapted for engaging and disengaging respectively said chain, a second device positioned and attached to said first device in a manner to effect movement of said first device from a first position to a second position while said first device is engaged to said chain for effecting an incremental movement of the portion of said chain in a direction longitudinally along said chain and in a manner to effect retraction of said first device to the first position while said first device is disengaged from said chain, and a third device positioned and adapted for engaging said chain to lock the portion of said chain in a fixed position while said first device is disengaged from said chain and for disengaging from said chain when said first device is engaged to said chain so that said first device may be moved to the second position for incrementally moving the portion of said chain in a direction longitudinally along said chain.

10. A conveyor according to claim 9 wherein said chain comprises an accumulation chain.

11. A conveyor according to claim 10 wherein said at least one set of devices comprises at least two of said at least one set of devices.

12. A conveyor according to claim 9 wherein said at least one set of devices comprises at least two of said at least one set of devices.

13. A conveyor according to claim 9 wherein each of said first, second, and third devices is a hydraulic cylinder.

14. A conveyor according to claim 9 wherein said chain comprises a series of cars and axles interconnecting said cars respectively.

15. A conveyor according to claim 9 wherein said chain comprises a series of cars and axles interconnecting said cars respectively and wherein each of said first and third devices has an extendable and retractable rod which has a cut-out in a terminal end thereof for engaging said axles respectively.

16. A method for incrementally moving elongate conveyor chain in a direction longitudinally along the chain comprising the steps of:
  (a) engaging a first device to the chain;
  (b) disengaging a second device from the chain;
  (c) moving the engaged first device from a first position to a second position thereby effecting an incremental movement of at least a portion of the chain from a first position to a second position in a direction longitudinally along the chain while the second device is disengaged from the chain;
  (d) engaging the second device to the chain to maintain the chain portion at the second position of the chain portion;
  (e) disengaging the first device from the chain; and
  (f) retracting the first device to the first position of the first device so that another incremental movement of at least a portion of the chain in a direction longitudinally along the chain may be effected.

17. A conveyor according to claim 1 wherein said first device cylinder includes a carriage and wherein said second device includes a cylinder having an extendable and retractable rod and wherein said second device rod is attached to said first device cylinder carriage.

18. A conveyor according to claim 9 wherein said first device cylinder includes a carriage and wherein said second device includes a cylinder having an extendable and retractable rod and wherein said second device rod is attached to said first device cylinder carriage.

19. A method according to claim 16 wherein the step of moving the engaged first device comprises providing a cylinder having a rod which is attached to a carriage for the first device and extending the rod, and wherein the step of retracting the first device comprises retracting the rod.

20. A method according to claim 16 wherein the step of engaging the first device to the chain comprises providing the first device to comprise a first cylinder having a rod which is engagable to and disengageable from the chain and extending the first device rod to engage the first device rod to the chain, and wherein the step of moving the engaged first device comprises providing a second cylinder having a rod which is attached to a carriage for the first cylinder and extending the second cylinder rod, and wherein the step of retracting the first device comprises retracting the second cylinder rod.

* * * * *